US009228497B2

(12) United States Patent
Ottow et al.

(10) Patent No.: US 9,228,497 B2
(45) Date of Patent: Jan. 5, 2016

(54) GAS TURBINE ENGINE WITH SECONDARY AIR FLOW CIRCUIT

(75) Inventors: Nathan Wesley Ottow, Indianapolis, IN (US); Nathan J. Cooper, Avon, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1042 days.

(21) Appl. No.: 13/339,015

(22) Filed: Dec. 28, 2011

(65) Prior Publication Data
US 2012/0167595 A1 Jul. 5, 2012

Related U.S. Application Data

(60) Provisional application No. 61/428,725, filed on Dec. 30, 2010.

(51) Int. Cl.
*F02C 7/18* (2006.01)
*F01D 25/12* (2006.01)
*F02C 3/08* (2006.01)
*F02C 3/04* (2006.01)

(52) U.S. Cl.
CPC . *F02C 7/18* (2013.01); *F01D 25/12* (2013.01); *F02C 3/04* (2013.01); *F02C 3/08* (2013.01)

(58) Field of Classification Search
CPC ............. F02C 3/08; F02C 3/05; F02C 3/103; F02C 7/12; F23R 3/002; F04D 29/44; F04D 29/444; F01D 5/081; F01D 5/082; F01D 9/026; F01D 9/045; F01D 25/08; F01D 25/12
See application file for complete search history.

(56) References Cited

U.S. PATENT DOCUMENTS

| | | | | |
|---|---|---|---|---|
| 2,584,899 A | * | 2/1952 | McLeod | F01D 9/041 384/313 |
| 5,555,721 A | | 9/1996 | Bourneuf et al. | |
| 6,035,627 A | * | 3/2000 | Liu | F02C 7/185 415/176 |
| 6,047,540 A | | 4/2000 | Dev | |
| 6,155,777 A | * | 12/2000 | Aschenbruck et al. | 415/115 |
| 6,190,123 B1 | | 2/2001 | Wunderwald et al. | |
| 6,276,896 B1 | | 8/2001 | Burge et al. | |
| 6,324,828 B1 | | 12/2001 | Willis et al. | |
| 6,672,072 B1 | * | 1/2004 | Giffin, III | 60/782 |
| 7,624,580 B2 | | 12/2009 | Fukutani | |
| 2008/0141678 A1 | | 6/2008 | Brunet et al. | |

(Continued)

FOREIGN PATENT DOCUMENTS

| | | |
|---|---|---|
| EP | 0 518 027 B1 | 7/1995 |
| EP | 1 882 826 | 1/2008 |
| EP | 2 072 830 | 6/2009 |

(Continued)

OTHER PUBLICATIONS

International Search Report and Written Opinion, PCT/US2011/067916, Rolls-Royce Corporation, May 25, 2012.

*Primary Examiner* — Andrew Nguyen
(74) *Attorney, Agent, or Firm* — McCracken & Gillen LLC

(57) ABSTRACT

One embodiment of the present invention is a unique gas turbine engine. Another embodiment of the present invention is a gas turbine engine having a unique secondary air flow circuit. Other embodiments include apparatuses, systems, devices, hardware, methods, and combinations for gas turbine engines and secondary air flow circuits. Further embodiments, forms, features, aspects, benefits, and advantages of the present application will become apparent from the description and figures provided herewith.

13 Claims, 2 Drawing Sheets

(56) References Cited

U.S. PATENT DOCUMENTS

2008/0141679 A1 6/2008 Behaghel et al.
2010/0028138 A1* 2/2010 Argaud et al. ................ 415/177

FOREIGN PATENT DOCUMENTS

| GB | 587511 | * | 4/1947 | ............ F04D 29/444 |
| GB | 2 336 645 | | 10/1999 | |

* cited by examiner

GAS TURBINE ENGINE WITH SECONDARY AIR FLOW CIRCUIT

CROSS REFERENCE TO RELATED APPLICATIONS

The present application claims benefit of U.S. Provisional Patent Application No. 61/428,725, filed Dec. 30, 2010, entitled GAS TURBINE ENGINE WITH SECONDARY AIR FLOW CIRCUIT, which is incorporated herein by reference.

FIELD OF THE INVENTION

The present invention relates to gas turbine engines, and more particularly, to gas turbine engines having secondary air flow circuits.

BACKGROUND

Gas turbine engine secondary air flow circuits that effectively transfer secondary air flow across an engine core flowpath remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment of the present invention is a gas turbine engine having a unique secondary air flow circuit. Other embodiments include apparatuses, systems, devices, hardware, methods, and combinations for gas turbine engines and secondary air flow circuits. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
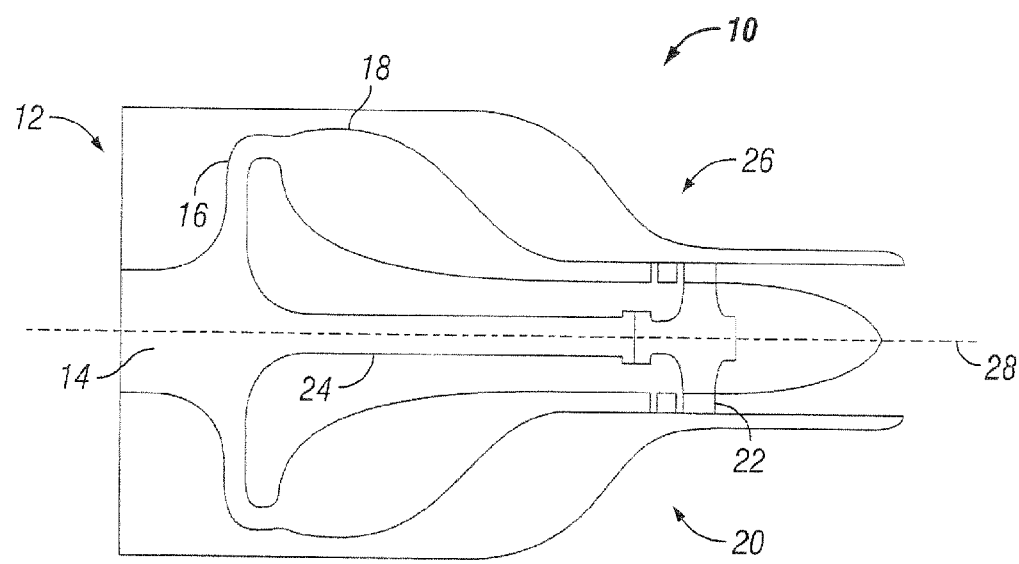
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a gas turbine engine 10 in accordance with an embodiment of the present invention is schematically depicted. In one form, gas turbine engine 10 is an axi-centrifugal flow machine, e.g., in the form of an air-vehicle power plant. In other embodiments, gas turbine engine 10 may be a centrifugal flow machine, an axial flow machine, or may be another flow configuration. Embodiments of the present invention include various gas turbine engine configurations, for example, including turbojet engines, turbofan engines, turboprop engines, and turboshaft engines having axial, centrifugal and/or axi-centrifugal compressors and/or turbines.

In one form, gas turbine engine 10 includes a compressor 12 having an impeller 14; a diffuser 16; a combustion system 18; a turbine 20 having a turbine rotor 22; and a shaft 24 coupling impeller 14 with turbine rotor 22. Combustion system 18 is in fluid communication with compressor 12 and turbine 20. Turbine rotor 22 is drivingly coupled to impeller 14 via shaft 24. Impeller 14, turbine rotor 22 and shaft 24 form a main engine rotor 26, which rotates about an engine centerline 28. Although only a single spool is depicted, it will be understood that embodiments of the present invention include both single-spool and multi-spool engines. The number of blades and vanes, and the number of stages thereof of compressor 12 and turbine 20 may vary with the needs of the application, e.g., the weight, efficiency and power output requirements of a particular application of gas turbine engine 10. In various embodiments, gas turbine engine 10 may include one or more fans, additional compressors and/or additional turbines.

During the operation of gas turbine engine 10, air is received at the inlet of compressor 12 and compressed. After having been compressed, the air is supplied to diffuser 16, which reduces the velocity of the pressurized air discharged from compressor 12. In one form, diffuser 16 is a radial diffuser. In other embodiments, other diffuser arrangements may be employed. The pressurized air exiting diffuser 16 is mixed with fuel and combusted in combustion system 18. The hot gases exiting combustion system 18 are directed into turbine 20. Turbine 20 extracts energy from the hot gases to, among other things, generate mechanical shaft power to drive compressor 12 via shaft 24. In one form, the hot gases exiting turbine 20 are directed into a nozzle (not shown), which provides thrust output for gas turbine engine 10. In other embodiments, additional compressor and/or turbine stages in one or more additional rotors upstream and/or downstream of compressor 12 and/or turbine 20 may be employed, e.g., in single or multi-spool gas turbine engines.

Figure 2:
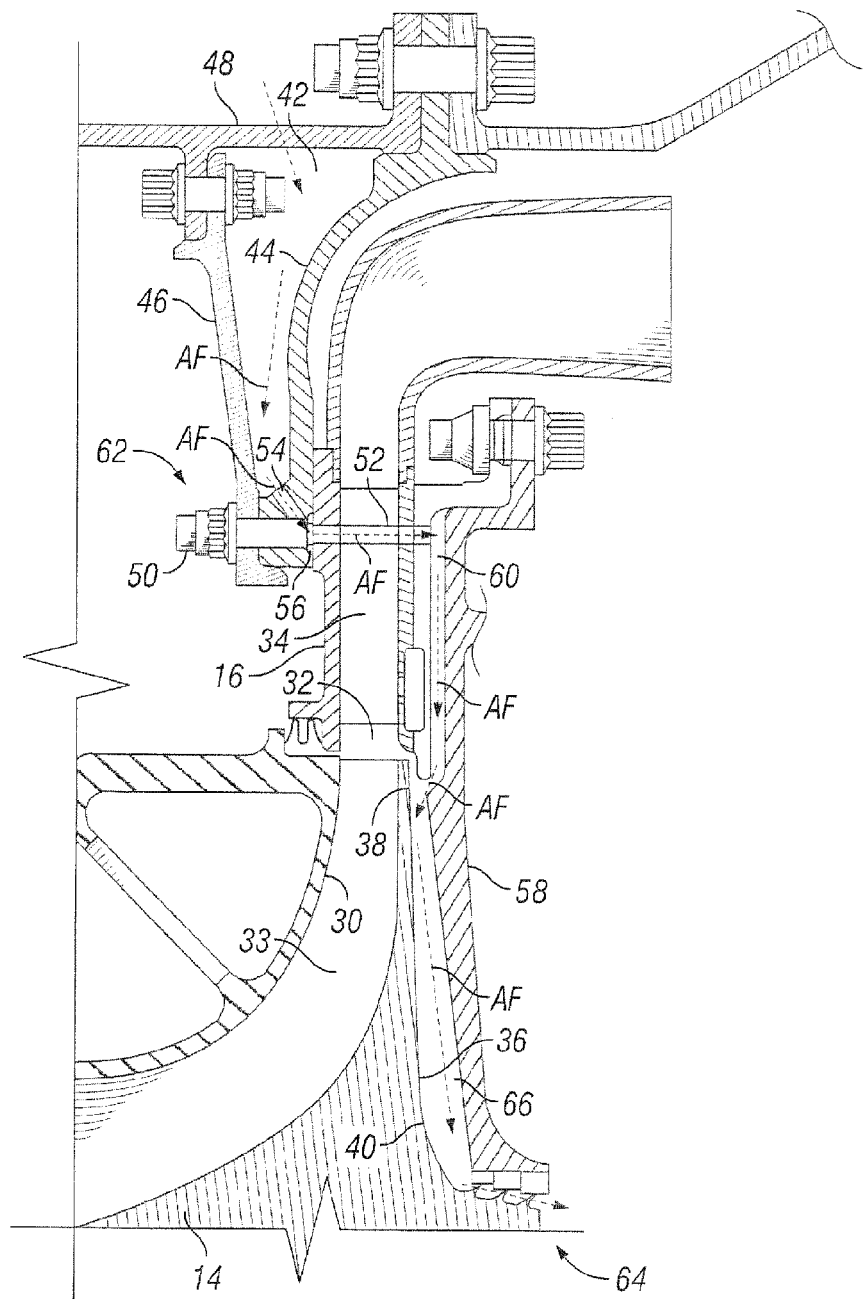
FIG. 2 is a cross-sectional view depicting some aspects of a non-limiting example of a compressor, a diffuser and some surrounding hardware, in accordance with an embodiment of the present invention.

Referring to FIG. 2, a cross-sectional view of some aspects of a non-limiting example of compressor 12, diffuser 16 and some surrounding hardware in accordance with an embodiment of the present invention is depicted. In one form, compressor 12 is a centrifugal compressor. In other embodiments, other compressor types may be employed. Compressor 12 includes a shroud 30 in which impeller 14 is disposed. Diffuser 16 is a flowpath structure configured to form a flowpath 32 downstream of impeller 14 for passing and diffusing the pressurized air flow generated by impeller 14. In other embodiments, other flowpath structures may be disposed downstream of impeller 14 in addition to or in place of diffuser 16.

The flow pressurized by impeller 14 exits impeller 14 radially outward into flowpath 32 formed by diffuser 16. The initial flowpath 32 width is defined primarily by the height of impeller blades 33 of impeller 14 within shroud 30. Compression of the air by operation of blades 33 within shroud 30 results in elevated temperatures in impeller 14, as well as thermal gradients across impeller 14. The elevated temperatures and thermal gradients adversely affect the life of impeller 14. In order to reduce peak temperatures in impeller 14, and in order to reduce thermal gradients in impeller 14, secondary air flow AF is provided to a back face 36 of impeller 14 opposite blades 33. Secondary air flow AF cools a hotter portion of impeller 14, e.g., a tip portion 38 of impeller 14, and also transfers heat from tip portion 38 to radially inward portion 40. Hence, secondary air flow AF reduces peak temperatures in impeller 14, as well as reduces thermal gradients by increasing temperatures in radially inward portion 40. The reduction of peak temperatures reduces impeller 14 material requirements by allowing a lower temperature-capable material to be employed in constructing impeller 14 than similar impellers operating under similar circumstances and conditions that to not receive secondary airflow such as secondary airflow AF. The reduced thermal gradients reduce thermally induced stresses, thus further reducing material requirements for impeller 14. One or both of the reduction in peak temperature and the temperature gradient may allow the use of a lower cost material in the construction of impeller 14.

In one form, secondary air flow is supplied to impeller 14 from a cavity 42 formed by a structure 44, a structure 46 and a structure 48. Cavity 42 is positioned on the opposite side of flowpath 32 from back face 36. In other embodiments, the secondary air flow may be supplied from another location. In one form, structures 44, 46 and 48 are static load bearing structures. In other embodiments, one or more of structures 44, 46 and 48 may not be load bearing structures. In still other embodiments, one or more of structures 44, 46 and 48 may not be static structures. Secondary air flow AF is supplied to cavity 42 defined by structures 44, 46 and 48 by means not shown. In one form, structure 48 is an engine case structure. In other embodiments, structure 48 may be another engine structure. Structures 44 and 46 are coupled to structure 48, and are configured to support diffuser 16 loads. In one form, structures 44 and 46 are coupled to diffuser 16 via a threaded fastener system 50. In other embodiments, structures 44 and 46 may be coupled to diffuser 16 via other means, e.g., including pins, cross-key arrangements or other threaded and/or non-threaded fastener types.

Diffuser 16 includes a plurality of vanes 34 that extend across flowpath 32, and are configured to guide the flow exiting impeller 14. In one form, each vane 34 includes a transfer opening 52 therein that extends through diffuser 16 and across flowpath 32. In other embodiments, fewer than all of vanes 34 may include transfer openings 52. Structure 44 includes a plurality of supply openings 54 in fluid communication with transfer openings 52 and with cavity 42. Supply openings 54 are configured to transmit secondary air flow from cavity 42 into transfer openings 52. In one form, transfer openings 52 are sized to control the flow rate of secondary air flow AF. In other embodiments, the flow rate of secondary air flow AF may be controlled by the size of openings 54. In still other embodiments, the flow rate of secondary air flow AF may be controlled by other effective areas or control means.

In one form, disposed between transfer openings 52 and supply openings 54 is a distribution channel 56. Distribution channel 56 fluidly couples transfer openings 52 and supply openings 54. Distribution channel 56 is operative to enhance the transition flow area between supply openings 54 and transfer openings 52, which assists the entry of the secondary air flow into transfer openings 52 from supply openings 54, and also reduces the need for precision indexing of structure 44 with respect to diffuser 16 to enhance alignment of openings 52 and 54. In one form, distribution channel 56 is an annular channel extending circumferentially around structure 44. In other embodiments, distribution channel 56 may take the form of discreet cavities. In one form, distribution channel 56 is formed in structure 44. In other embodiments, distribution channel 56 may be formed in diffuser 16 in addition to or in place of structure 44.

Disposed opposite diffuser 16 and back face 36 of impeller 14 is a static structure in the form of a cover plate 58. In one form, cover plate 58 includes a plurality of openings 60 that are configured to direct the secondary air flow from transfer openings 52 to tip portion 38 of impeller 14. In one form, openings 60 are configured to induce preswirl in secondary airflow AF in the direction of rotation of impeller 14, e.g., in order to reduce losses. In other embodiments, openings 60 may not be configured to induce preswirl. In one form, openings 60 are slots formed in cover plate 58. In other embodiments, a single opening 60, e.g., in the form of an annular cavity, may be employed. In still other embodiments, cover plate 58 or another component may simply be spaced apart from diffuser 16 by some desired amount. Cover plate 58 is spaced apart from back face 36 of impeller 14, and is operative to direct the secondary air flow from tip portion 38 of impeller 14, radially inward along the back face of impeller 14.

Openings 54, 52 and 60, as well as a cavity 66 defined between impeller 14 and cover plate 58, form a cooling circuit 62. Cooling circuit 62 is operative to deliver secondary air flow 64 to impeller 14 for controlling the temperature of a portion of impeller 14, e.g., back face 36 in the present embodiment, wherein secondary air flow AF is delivered to back face 36 of impeller 14 from across flowpath 32 through transfer openings 52. Secondary air flow AF is supplied from cavity 42 at a pressure sufficient to overcome pressure gradients, and centrifugal loading imposed by back face 36, resulting in a net positive flow radially inward from tip portion 38. A flow discourager 64 is positioned at the end of cooling circuit 62 to reduce the secondary air flow rate exiting back face 36 of impeller 14, and to prevent ingress of other gases into the cavity 66 defined between cover plate 58 and impeller 14 back face 36. In one form flow discourager 64 is a labyrinth seal. In other embodiments, flow discourager 64 may take other forms, and may be, for example and without limitation, a carbon seal system or other type of sealing or flow discouraging system. In one form, secondary air flow AF exiting flow discourager 64 is supplied to turbine 20 as cooling air. In other embodiments, secondary air flow AF may be, for example, supplied to other components, or may be supplied to the engine core flowpath, or may be dumped overboard.

Embodiments of the present invention include a gas turbine engine, comprising: a compressor having an impeller; a diffuser having a plurality of diffuser vanes; wherein the diffuser forms a flowpath downstream of the impeller; wherein the diffuser vanes extend across the flowpath; and wherein at least one of the diffuser vanes has a first opening extending through the diffuser vanes and across the flowpath; a combustor in fluid communication with the compressor; a turbine in fluid communication with the combustor; and a secondary flow circuit operative to deliver secondary air flow to the impeller for controlling a temperature of a portion of the impeller, wherein the secondary air flow is delivered to the impeller from across the flowpath through the first opening.

In a refinement, the impeller is a centrifugal impeller, and wherein the diffuser is a radial diffuser.

In another refinement, the impeller includes a plurality of blades and a back face opposite the plurality of blades, further comprising a static structure spaced apart from the back face and configured to direct the secondary air flow from the first opening to the back face of the impeller.

In yet another refinement, the static structure is configured to direct the secondary air flow from a tip portion of the impeller radially inward along the back face of the impeller.

In still another refinement, the static structure includes a second opening configured to direct the secondary air flow from the first opening to the tip portion of the impeller.

In yet still another refinement, the gas turbine engine further comprises a first static structure coupled to the diffuser and having an opening therein configured to supply the secondary air flow to at least one diffuser vane from a cavity adjacent to the first static structure.

In a further refinement, the first static structure is a load bearing structure of the gas turbine engine.

In a yet further refinement, the gas turbine engine further comprises a second static structure operative to form the cavity in conjunction with the first static structure, wherein the first static structure and the second static structure are configured to support diffuser loads.

In a still further refinement, the gas turbine engine further comprises an engine case, wherein the first static structure and the second static structure are coupled to the engine case; and wherein the engine case, the first static structure and the second static structure form the cavity.

Embodiments of the present invention include a gas turbine engine, comprising: a compressor having an impeller and an impeller configured to generate a pressurized air flow; a flowpath structure configured to form a flowpath downstream of the compressor and receive the pressurized air flow, wherein the flowpath structure includes a stationary structure extending across the flowpath and having a transfer opening extending therethrough and across the flowpath; a source of secondary air flow disposed on one side of the flowpath; and a secondary flow circuit operative to deliver a secondary air flow to the impeller for controlling a temperature of a portion of the impeller, wherein the secondary air flow is delivered to the impeller across the flowpath through the transfer opening.

In a refinement, the impeller includes a plurality of blades and a back face opposite the plurality of blades, further comprising a static structure configured to direct the secondary air flow from the transfer opening to the back face of the impeller.

In another refinement, the gas turbine engine further comprises a flow discourager between the static structure and the impeller, wherein the flow discourager is configured to reduce a flow rate of the secondary air flow exiting the back face of the impeller.

In another refinement, the flow discourager is a labyrinth seal.

In yet another refinement, the static structure is configured to direct the secondary air flow from a tip portion of the impeller radially inward along the back face of the impeller.

In still another refinement, the gas turbine engine further comprises a static structure coupled to the stationary structure and having a supply opening therein configured to supply the secondary air flow to the transfer opening.

In yet still another refinement, the gas turbine engine further comprises a distribution channel fluidly coupling the supply opening with the transfer opening.

In a further refinement, the gas turbine engine further comprises a turbine, wherein the secondary air flow is delivered to the turbine after acting on the impeller.

Embodiments of the present invention include a gas turbine engine, comprising: a compressor having an impeller and an impeller configured to generate a pressurized air flow; a flowpath structure configured to form a flowpath downstream of the compressor and receive the pressurized air flow; a source of secondary air flow disposed on one side of the flowpath; and means for conducting the secondary air flow across the flowpath to an opposite side of the flowpath for controlling a temperature of a portion of the impeller.

In a refinement, the impeller includes a back face, further comprising means for directing the secondary air flow radially inward along the back face of the impeller.

In another refinement, the gas turbine engine further comprises means for controlling a flow rate of the secondary air flow.

In yet another refinement, the means for conducting includes a diffuser having a plurality of diffuser vanes; wherein the diffuser forms a flowpath downstream of the impeller; wherein the diffuser vanes extend across the flowpath; wherein at least some of the diffuser vanes each have an opening extending through the diffuser vanes and across the flowpath, and wherein the openings are configured to transfer the secondary air flow across the flowpath.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a compressor having an impeller;
a diffuser having a plurality of diffuser vanes;
wherein the impeller is a centrifugal impeller, and wherein the diffuser is a radial diffuser;
wherein the diffuser forms a flowpath downstream of the impeller;
wherein the diffuser vanes extend across the flowpath; and
wherein at least one of the diffuser vanes has a first opening extending through the diffuser vanes and across the flowpath;
a combustor in fluid communication with the compressor;
a turbine in fluid communication with the combustor; and
a secondary flow circuit operative to deliver secondary air flow to the impeller for controlling a temperature of a portion of the impeller, wherein the secondary air flow is delivered to the impeller from across the flowpath through the first opening; and
one or more walls defining a cavity separate from the flowpath, the one or more walls further having an opening therein configured to supply the secondary air flow from the cavity to at least one diffuser vane, wherein the impeller includes a plurality of blades and a back face opposite the plurality of blades, further comprising a static structure spaced apart from the back face and configured to direct the secondary air flow from a radially outer tip portion of the impeller radially inward along the back face of the impeller.

2. The gas turbine engine of claim 1, wherein the static structure is configured to direct the secondary air flow from the first opening to the back face of the impeller.

3. The gas turbine engine of claim 1, wherein the static structure includes a second opening configured to direct the secondary air flow from the first opening to the tip portion of the impeller.

4. The gas turbine engine of claim 1, wherein the one or more walls includes a first wall coupled to the diffuser, the first wall having the opening therein configured to supply the secondary air flow to the at least one diffuser vane from the cavity adjacent to the first wall.

5. The gas turbine engine of claim 4, wherein the first wall is a load bearing structure of the gas turbine engine.

6. The gas turbine engine of claim 4, wherein the one or more walls includes a second wall operative to form the cavity in conjunction with the first wall, wherein the first wall and the second wall are configured to support diffuser loads.

7. The gas turbine engine of claim 6, wherein the one or more walls includes an engine case, wherein the first wall and the second wall are coupled to the engine case; and wherein the engine case, the first wall and the second wall form the cavity.

8. A gas turbine engine, comprising:
a centrifugal compressor having an impeller and an impeller configured to generate a pressurized air flow;
a flowpath structure configured to form a flowpath downstream and radially outward of the impeller of the compressor and receive the pressurized air flow,
wherein the flowpath structure includes a stationary structure extending across the flowpath and having a transfer opening extending therethrough and across the flowpath;
a source of secondary air flow disposed on one side of the flowpath; and
a secondary flow circuit operative to deliver a secondary air flow to the impeller for controlling a temperature of a portion of the impeller,
wherein the secondary air flow is delivered to the impeller across the flowpath through the transfer opening; and
a first static structure coupled to the stationary structure and having a supply opening therein configured to supply the secondary air flow to the transfer opening, wherein the impeller includes a plurality of blades and a back face opposite the plurality of blades, further comprising a second static structure configured to direct the secondary air flow from a radially outer tip portion of the impeller radially inward along the back face of the impeller.

9. The gas turbine engine of claim 8, wherein the second static structure is configured to direct the secondary air flow from the transfer opening to the back face of the impeller.

10. The gas turbine engine of claim 9, further comprising a flow discourager between the second static structure and the impeller, wherein the flow discourager is configured to reduce a flow rate of the secondary air flow exiting the back face of the impeller.

11. The gas turbine engine of claim 10, wherein the flow discourager is a labyrinth seal.

12. The gas turbine engine of claim 8, further comprising a distribution channel fluidly coupling the supply opening with the transfer opening.

13. The gas turbine engine of claim 8, further comprising a turbine, wherein the secondary air flow is delivered to the turbine after acting on the impeller.

* * * * *